(12) United States Patent
Marconi

(10) Patent No.: US 11,927,168 B2
(45) Date of Patent: Mar. 12, 2024

(54) METHOD TO CONTROL A ROAD VEHICLE PROVIDED WITH AN INTERNAL COMBUSTION ENGINE DURING A GEAR SHIFT

(71) Applicant: FERRARI S.P.A., Modena (IT)

(72) Inventor: Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/184,169

(22) Filed: Mar. 15, 2023

(65) Prior Publication Data

US 2023/0304465 A1 Sep. 28, 2023

(30) Foreign Application Priority Data

Mar. 22, 2022 (IT) .................. 102022000005591

(51) Int. Cl.
| | |
|---|---|
| *F02P 5/15* | (2006.01) |
| *F02D 13/02* | (2006.01) |
| *F02D 41/02* | (2006.01) |
| *F02D 41/38* | (2006.01) |
| *F02P 5/04* | (2006.01) |
| *F02P 5/152* | (2006.01) |

(52) U.S. Cl.
CPC ........ *F02P 5/1521* (2013.01); *F02D 13/0249* (2013.01); *F02D 41/023* (2013.01); *F02D 41/38* (2013.01); *F02P 5/045* (2013.01)

(58) Field of Classification Search
CPC ..... F02P 5/1521; F02P 5/045; F02D 13/0249; F02D 41/023; F02D 41/38
See application file for complete search history.

(56) References Cited

U.S. PATENT DOCUMENTS

| | | | | |
|---|---|---|---|---|
| 5,758,493 | A | * 6/1998 | Asik | ................. F01N 3/0842 60/297 |
| 2010/0217489 | A1 | * 8/2010 | Turski | ................. F02D 41/28 701/110 |

(Continued)

FOREIGN PATENT DOCUMENTS

| | | |
|---|---|---|
| DE | 102008054060 A1 | 8/2009 |
| DE | 102016001711 A1 | 8/2016 |

OTHER PUBLICATIONS

Italian Search Report for Application No. 102022000005591; Filing Date: Mar. 22, 2022; dated Nov. 9, 2022, 9 pages.

*Primary Examiner* — Joseph J Dallo
(74) *Attorney, Agent, or Firm* — CANTOR COLBURN LLP

(57) ABSTRACT

A method to control a road vehicle provided with an internal combustion engine having a plurality of cylinders and with a servo-assisted transmission. The control method comprises the steps of: establishing a minimum spark advance which should not be exceeded in order to avoid the risk of knocking or spontaneous ignitions of the mixture; temporarily reducing, during a gear shift in the servo-assisted transmission, a torque generated by the internal combustion engine by setting an actual spark advance, which is smaller than the minimum spark advance, for one single thermodynamic cycle of each cylinder; and cancelling the injection of fuel into each cylinder in the thermodynamic cycle immediately following the thermodynamic cycle carried out with an actual spark advance smaller than the minimum spark advance.

11 Claims, 3 Drawing Sheets

(56) References Cited

U.S. PATENT DOCUMENTS

| | | | |
|---|---|---|---|
| 2010/0324789 A1* | 12/2010 | Ogawa | B60W 30/19 |
| | | | 701/54 |
| 2014/0365092 A1* | 12/2014 | Kawamoto | F02D 41/023 |
| | | | 701/54 |
| 2017/0008527 A1* | 1/2017 | Nishida | B60W 10/06 |
| 2017/0356359 A1* | 12/2017 | Glugla | F02D 41/0025 |
| 2022/0003181 A1 | 1/2022 | Honda | |

* cited by examiner

METHOD TO CONTROL A ROAD VEHICLE PROVIDED WITH AN INTERNAL COMBUSTION ENGINE DURING A GEAR SHIFT

CROSS-REFERENCE TO RELATED APPLICATIONS

This patent application claims priority from Italian patent application no. 102022000005591 filed on Mar. 22, 2022, the entire disclosure of which is incorporated herein by reference.

TECHNICAL FIELD

The invention relates to a method to control a road vehicle provided with an internal combustion engine during a gear shift.

PRIOR ART

A significant component in the judgement of a high-perforce sports car is the "quality" of the sound emitted by the exhaust system (not only and not primarily in terms of intensity of the sound, but especially in terms of "likeability" of the emitted sound), namely the degree of satisfaction in the use of a high-performance sports car is significantly influenced also by the "quality" of the sound emitted by the exhaust system.

Generally speaking, from the point of view of the sound emitted by the exhaust system, turbocharged engines are disadvantaged as the presence of the turbine along the exhaust duct and of the compressor along the intake duct add a filtering and a lowering of the sound levels both of the exhaust system and of the intake system. Furthermore, recent EURO6d emission standards establish the use of exhaust gas treatment devices that significantly jeopardize sound performances, as a particulate filter (also called GPF, i.e. "Gasoline Particulate Filter") must necessarily be present in series to the catalytic converter, even in petrol engines, and the particulate filter especially affects the sound emitted by the exhaust system.

Patent application US2014365092A1 discloses the execution of a gear shift in an automatic transmission provided with a torque converter, in case of release of the accelerator pedal when the lock-up clutch is in a locking state.

Patent application DE102008054060A1 discloses a control system to control an internal combustion engine, which entails cutting the supply of fuel to one or more cylinders in order to reduce the generated torque; in a coordinated manner with the cut of the fuel supply, a spark advance is increased.

DESCRIPTION OF THE INVENTION

The object of the invention is to provide a control method to control a road vehicle provided with an internal combustion engine during a gear shift, said control method allowing users to obtain, during a gear shift, a sound emitted by the exhaust system that has a highly "racing" character, without jeopardizing performances and without subjecting the internal combustion engine to excessive mechanical and thermal stresses.

According to the invention there is provided a control method to control a road vehicle provided with an internal combustion engine during a gear shift according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
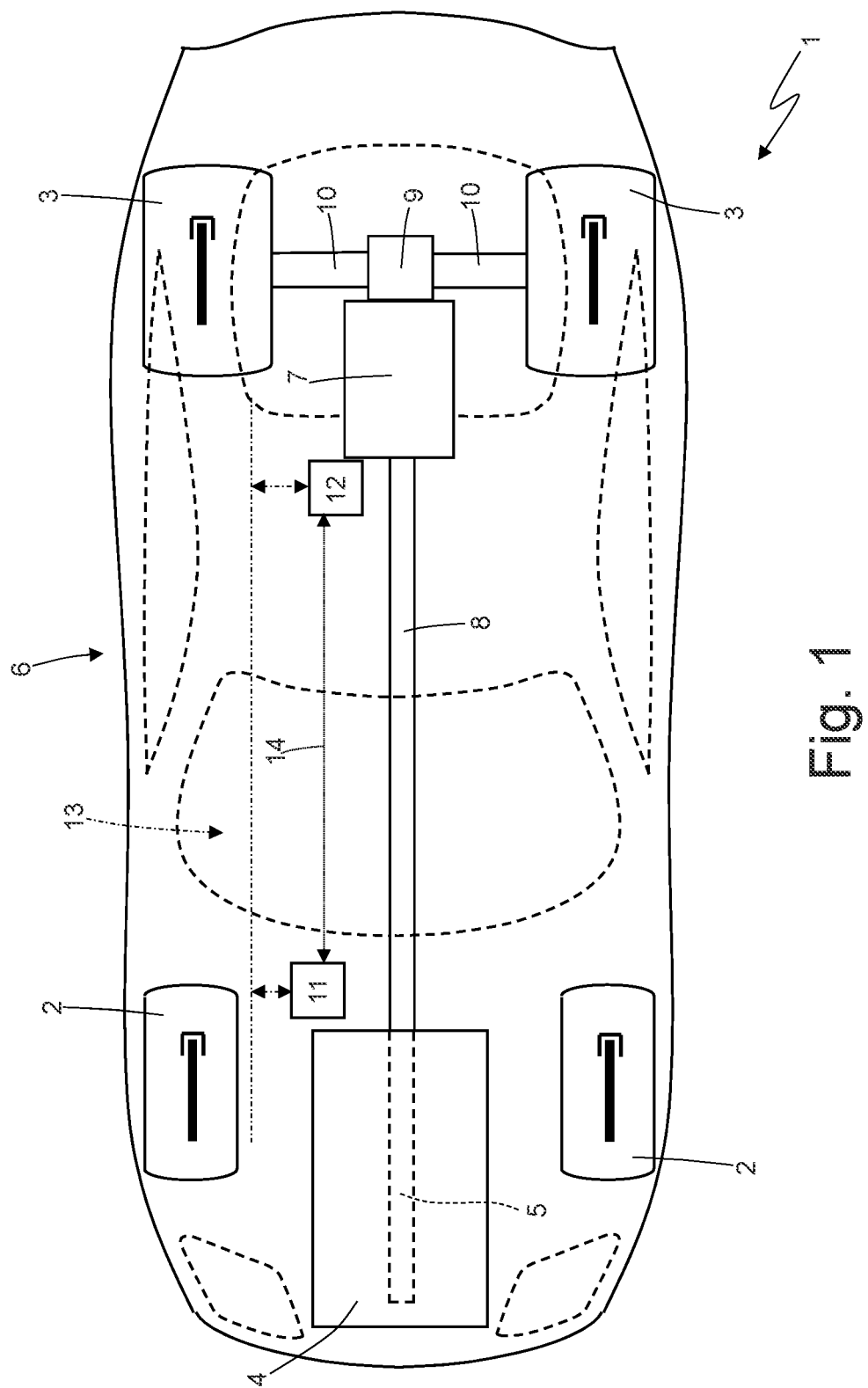
FIG. 1 is a schematic plan view of a road vehicle controlled with the control method according to the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a crankshaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the crankshaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises an engine control unit 11, which controls the engine 4, a drivetrain control unit 12, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the engine control unit 11 and the drivetrain control unit 12 are connected to the BUS line 13 and, therefore, can communicate with one another by means of messages sent through the BUS line 13. Furthermore, the engine control unit 11 and the drivetrain control unit 12 can directly be connected to one another by means of a dedicated synchronization cable 14, which is capable of directly transmitting a signal from the drivetrain control unit 12 to the engine control unit 11 without the delays caused by the BUS line 13. Alternatively, the synchronization cable 14 could be absent and all communications between the two control units 11 and 12 could be exchanged using the BUS line 13.

Figure 2:
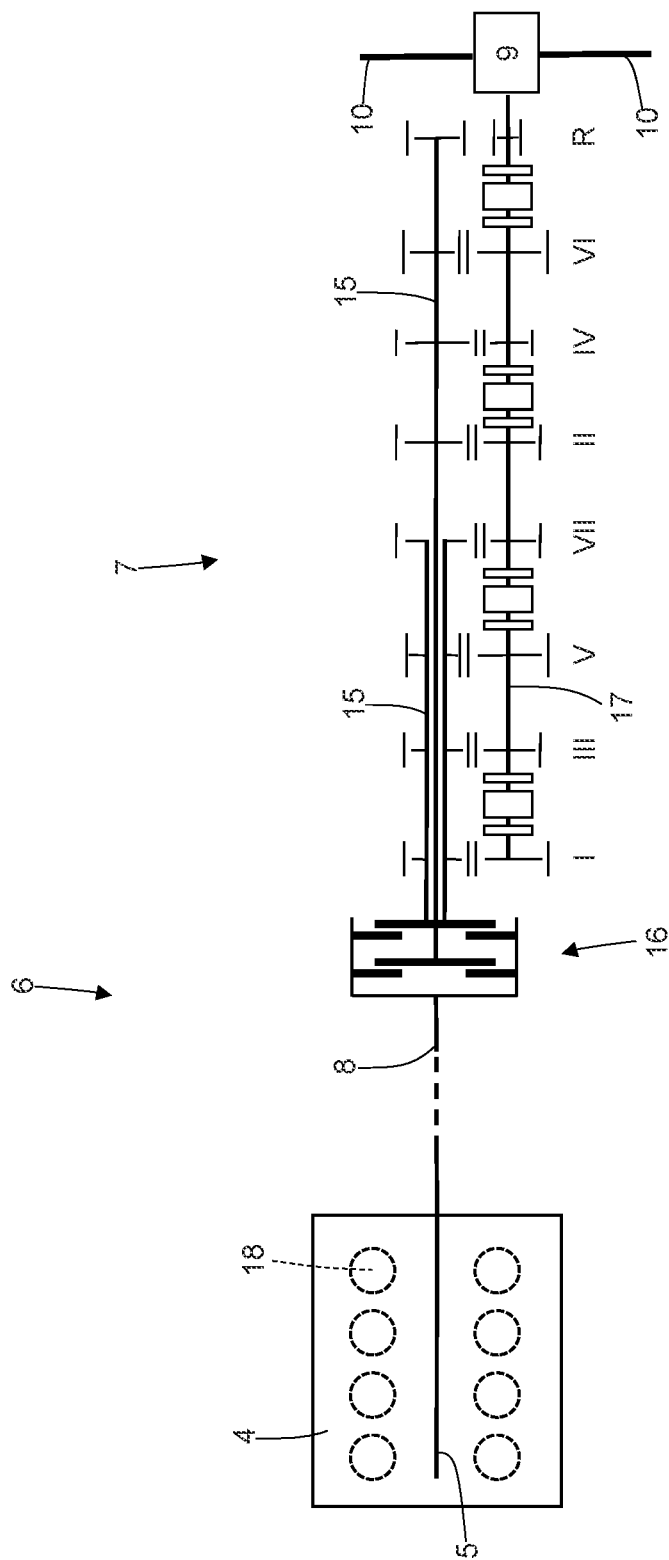
FIG. 2 is a schematic view of a drivetrain of the road vehicle of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the crankshaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

According to FIG. 2, the internal combustion engine 4 comprises a plurality of cylinders 18; the embodiment shown in FIG. 2 features eight cylinders 18 arranged in a "V"-like shape, but the number and/or the arrangement of the cylinders 18 could be different.

Figure 3:
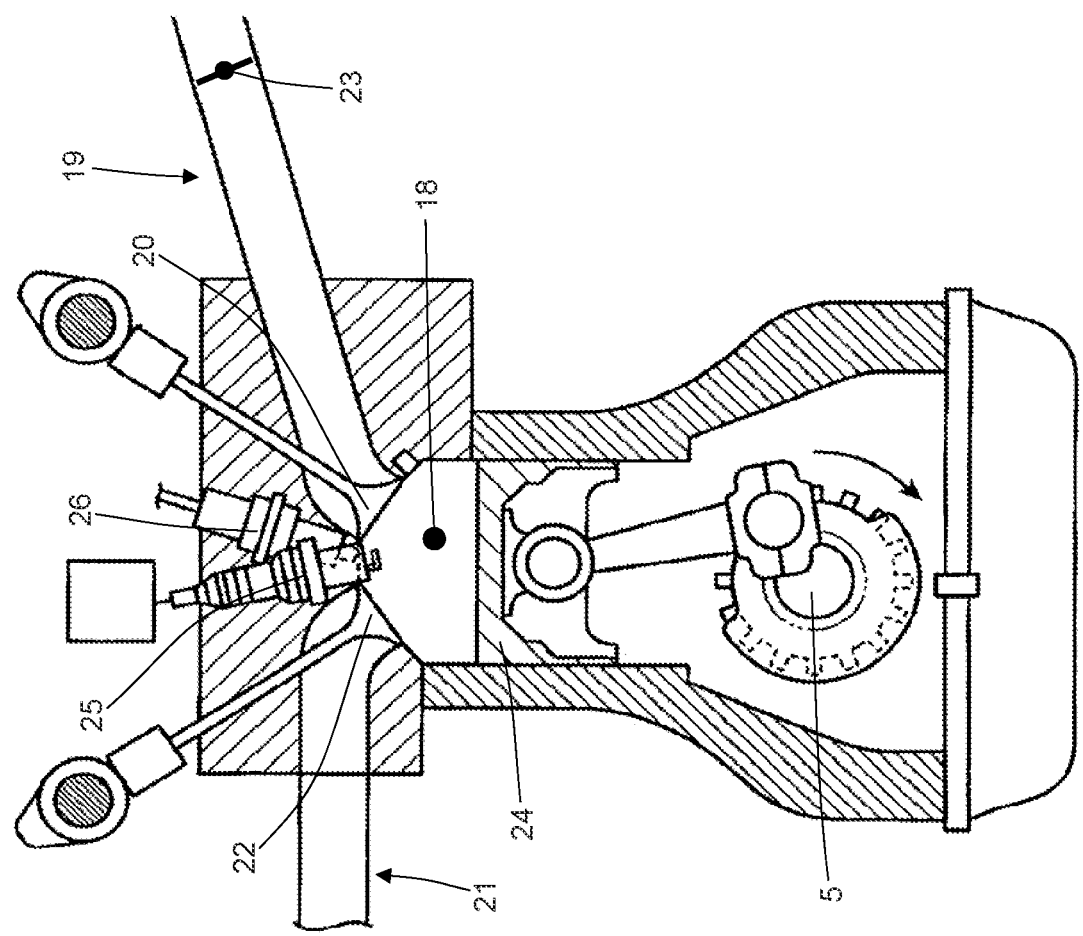
FIG. 3 is a schematic view of an internal combustion engine of the road vehicle of FIG. 1.

According to FIG. 3, each cylinder 18 (only one of them being shown in FIG. 3) is connected to an intake duct 19 through two intake valves 20 (only one of them being shown in FIG. 3) and is connected to an exhaust duct 21 through two exhaust valves 22 (only one of them being shown in FIG. 3). The intake duct 19 receives fresh air (i.e. air coming from the outside) through a throttle valve 23.

Inside each cylinder 18 there is a piston 24, which slides, with a reciprocating motion, along the cylinder 18 and is connected to the crankshaft 5. On the crown of each cylinder 18, next to the intake valves 20 and the exhaust valves 22, there are a spark plug 25 and a fuel injector 26, which directly injects fuel into the cylinder 18.

Each cylinder 18 performs, one after the other, thermodynamic cycles (usually Otto cycles), each having four strokes (intake, compression expansion, exhaust) and requiring, in order to be completed, two complete rotations (revolutions) of the crankshaft 5.

During the execution of a gear shift (upshift or downshift), the drivetrain control unit 12 becomes the "master" and directly acts upon the dual-clutch transmission 7 in order to physically perform the gear shift and, at the same time, sends (through the BUS line 13 or through the synchronization cable 14) to the engine control unit 11 the torque and rotation speed targets to be operated during the execution of the gear shift. In particular, during a gear shift (upshift or downshift), the drivetrain control unit 12 asks the engine control unit 11 to temporarily reduce (namely, for a few thermodynamic cycles) the torque generated by the internal combustion engine 4.

Since the time needed for the gear shift is relatively short (the overall duration of a gear shift can be smaller than 100 milliseconds in the sports driving mode and can amount to a few hundreds milliseconds in the comfort driving mode), the engine control unit 11 reduces the torque generated by the internal combustion engine 4 during a gear shift by (also) acting upon the spark advance, namely by decreasing (advancing) the actual spark advance compared to the ideal spark advance that would ensure the maximum efficiency of the thrust produced by the combustion and, hence, the maximum generation of torque.

The spark advance generally relates to the angular position of the crankshaft 5 (hence, is expressed in degrees) and indicates the angular distances existing between the position of the crankshaft 5 in which where the spark plug 25 is activated in order to produce the ignition spark and the position of the crankshaft 5 in which the piston 24 reaches the top dead centre. The ignition is activated with an advance because, since petrol combustion is relatively slow, an ignition of the mixture at the top dead centre would excessively delay the pressure peak inside the cylinder 18 and, hence, would significantly reduce the thrust exerted by the combustion upon the piston 24 during the expansion stroke; by setting an ideal spark advance, a delay in the pressure peak is obtained, which allows the combustion to be exploited as much as possible close to the top dead centre, thus ensuring a higher engine work due to an increase in the indicated mean pressure.

The spark advance is zero if the spark plug 25 is activated exactly when the piston 24 reaches the top dead centre, is positive if the spark plug 25 is activated before the piston 24 reaches the top dead centre and is negative (namely, becomes a spark delay) if the spark plug 25 is activated after the piston 24 has reached the top dead centre. Therefore, increasing the spark advance means advancing the activation of the spark plug 25 relative to the top dead centre of the piston 24 to a greater extent, whereas decreasing the spark advance means delaying the activation of the spark plug 25 relative to the top dead centre of the piston 24.

The engine control unit 11 uses a three-dimensional map, which provides the ideal spark advance depending on the speed and on the load of the internal combustion engine 1 (the map could also be set based on the operating temperature and on the supply pressure). As mentioned above, during a gear shift, the engine control unit 11 temporarily reduces (namely, for a few thermodynamic cycles) the torque, by decreasing (degrading, advancing) the spark advance, namely by using an actual spark advance that is smaller than the ideal spark advance.

The engine control unit 11 uses a further three-dimensional map, which provides a minimum spark advance depending on the speed and on the load of the internal combustion engine 1 (the map could also be set based on the operating temperature and on the supply pressure); the minimum spark advance should not be exceeded in order to avoid the risk of knocking or spontaneous ignitions of the mixture, namely the actual spark advance can be reduced relative to the ideal spark advance, in order to reduce the torque, but should never be smaller than the minimum spark advance, so as to avoid triggering knocking or spontaneous ignitions of the mixture.

When, in a spark-ignition engine, the flame hits the entire chamber starting from the area of the spark plug, without encountering other spontaneous ignitions along its path, the combustion took place in a regular manner. Under some operating conditions, however, there can be flame fronts that start from still unburnt areas, due to the pressure and temperature increase in the area that has not reacted yet as a consequence of the advancement of the combustion or to combustions that start even before the production of the spark because of particular conditions present in the combustion chamber. These phenomena are known as knock and pre-ignition or mega-knock, respectively. They are both anomalous combustion forms and are very important, for they limit engine performances and efficiency. They manifest themselves, to the outside, with the emission of a characteristic metal-like noise, similar to a pounding sound, and with vibrations as well as with an accentuated heating, which can also cause, in particularly serous situations, the damaging of mechanical parts of the engine.

To sum up, during a gear shift, the engine control unit 11 establishes a minimum spark advance, which should not be exceeded in order to avoid knocking or spontaneous ignitions of the mixture, and, at the same time, temporarily reduces a toque generated by the internal combustion engine 4 by (also) acting upon the spark advance.

In order to temporarily reduce (i.e. for a few thermodynamic cycles) the torque during the gear shift, the engine control unit 11 sets an actual spark advance smaller than the minimum spark advance for one single thermodynamic cycle of each cylinder 18, so that the ignition takes place later than established by the minimum spark advance;

namely, for one single thermodynamic cycle of each cylinder 18, the actual spark advance is smaller than the minimum spark advance, so that, for the sole thermodynamic cycle of each cylinder 18, the ignition takes place later than established by the minimum spark advance (hence, with the risk of knocking or spontaneous ignitions of the mixture in the absence of corrective measures explained below).

Furthermore, the engine control unit 11 cancels the injection of fuel into each cylinder 18 in the thermodynamic cycle immediately following the thermodynamic cycle carried out with an actual spark advance smaller than the minimum spark advance; namely, after each cylinder 18 has carried out a thermodynamic cycle in which the actual spark advance is smaller than the minimum spark advance, a thermodynamic cycle is carried out under cut-off conditions (namely, without injection fuel) so as not to generate any combustion (which is impossible in the absence of fuel) and "wash" ("clean") the cylinder 18 from the remains of the combustion of the previous thermodynamic cycle (as a matter of fact, the combustion of the previous thermodynamic cycle took place with a great delay due to the actual spark advance smaller than the minimum spark advance and, hence, can leave residual effects, especially of the thermal kind, in the following thermodynamic cycle).

Thanks to the execution, immediately after the thermodynamic cycle carried out with an actual spark advance smaller than the minimum spark advance, of a thermodynamic cycle under cut-off conditions and, hence, in the complete absence of fuel, knocking or spontaneous ignitions of the mixture are avoided, since the cylinder 18 (due to the previous thermodynamic cycle carried out with an actual spark advance smaller than the minimum spark advance) would be subject to the occurrence of knocking or mixture spontaneous ignition events (because it has, on the inside, a higher temperature, for it has not had the time to properly cool down because of the delayed combustion), but, since it has no fuel on the inside, cannot actually cause knocking or spontaneous ignitions of the mixture.

Due to the delayed combustion of the mixture taking place during the thermodynamic cycle carried out with an actual spark advance smaller than the minimum spark advance, upon opening of the exhaust valves 22 the pressure inside the cylinder 18 is still very high and this generates, in the entire exhaust system of the internal combustion engine 4, a pressure wave that turns into an impulsive and extremely intense exhaust noise (a sort of explosion), which is typical for a racing car and, hence, is highly appreciated by high-performance car drivers.

As mentioned above, the engine control unit 11 causes each cylinder 18 of the internal combustion engine 4 to perform one single thermodynamic cycle with an actual spark advance smaller than the minimum spark advance and, therefore, if there are eight cylinders 18, eight thermodynamic cycles with an actual spark advance smaller than the minimum spark advance are carried out as a whole and for each gear shift. In particular, the engine control unit 11 carries out the single thermodynamic cycle with a spark advance smaller than the minimum spark advance in sequence in all cylinders 18, so that all cylinders 18 carry out said single thermodynamic cycle with a spark advance smaller than the minimum spark advance within a time window corresponding to two complete rotations of a crankshaft 5. In this way, the increase in the noise generated by the exhaust system is concentrated in a reduced time window and, therefore, is particularly intense and impulsive (features that are highly appreciated by the drivers of a high-performance car).

Owing to the above, the engine control unit 11 carries out, with a spark advance greater than the minimum spark advance, so that the ignition takes place sooner (earlier) than established by the minimum spark advance, all other thermodynamic cycles taking place during the gear shift and other than the thermodynamic cycle carried out with the spark advance smaller than the minimum spark advance.

According to a preferred embodiment, the engine control unit 11 determines a quantity of fuel to be injected into each cylinder 18 during the single thermodynamic cycle carried out with an actual spark advance smaller than the minimum spark advance, so that the combustion takes place under exactly stoichiometric conditions (during a gear shift, the combustion usually takes place under excess fuel conditions in order to cool the cylinders 18). In this way, the fuel combustion taking place during the thermodynamic cycle carried out with an actual spark advance smaller than the minimum spark advance produces a greater pressure and, hence, makes the pressure wave propagating along the exhaust system of the internal combustion engine 4 more intense.

According to a preferred embodiment, the engine control unit 11 determines a quantity of fuel to be injected into each cylinder 18 during all other thermodynamic cycles taking place during the gear shift and other than the thermodynamic cycle carried out with an actual spark advance smaller than the minimum spark advance, so that the combustion takes place under excess fuel conditions (as mentioned above, the excess fuel helps the cylinders 18 cool down).

According to a preferred embodiment, the engine control unit 11 takes to a maximum value an opening advance of exhaust valves 22 in each cylinder 18 during the single thermodynamic cycle carried out with an actual spark advance smaller than the minimum spark advance; in this way, the exhaust valves 22 open when the pressure inside the cylinder 18 is higher and, hence, the pressure wave propagating along the exhaust system of the internal combustion engine 4 is more intense.

According to a preferred embodiment, the engine control unit 11 maximizes (as much as possible) an opening of a throttle valve 23 during the intake in order to maximize the quantity of air taken in during the single thermodynamic cycle carried out with an actual spark advance smaller than the minimum spark advance. In this way, the fuel combustion taking place during the thermodynamic cycle carried out with an actual spark advance smaller than the minimum spark advance produces a greater pressure because it uses more air (and, obviously, more fuel as it occurs under stoichiometric conditions) and, hence, makes the pressure wave propagating along the exhaust system of the internal combustion engine 4 more intense.

According to a preferred embodiment, the engine control unit 11 carries out, for each cylinder 18, the single thermodynamic cycle with a spark advance smaller than the minimum spark advance in coincidence with the maximum reduction of the torque during the gear shift (namely, when the maximum reduction of the torque during the gear shift is requested, in the instant in which it is requested). Indeed, the single thermodynamic cycle carried out with a spark advance smaller than the minimum spark advance produces a moderate torque and is followed by a cut-off thermodynamic cycle, which generates a zero torque; hence, the single thermodynamic cycle carried out with a spark advance smaller than the minimum spark advance leads to a significant torque "gap", even though it is very quick.

According to a preferred embodiment, the actual spark advance smaller than the minimum spark advance is negative (namely, constitutes an ignition delay relative to the top dead centre) so as to cause the ignition to take place past the top dead centre of the corresponding piston 24 during the expansion stroke of the piston 18 (in fact, the minimum spark advance often is negative as well and, in this case, the actual spark advance is negative and has an absolute value that is greater than an absolute value of the minimum spark advance). In other words, the actual spark advance smaller than the minimum spark advance is negative, namely corresponds to an ignition delay, and causes the ignition to take place past the top dead centre of the corresponding piston 24.

According to a preferred embodiment, the actual spark advance is such as to cause the ignition to take place before the opening of exhaust valves 22; namely, the maximum limit of the actual spark advance consists of the opening of the exhaust valves 22.

According to a preferred embodiment, the actual spark advance is smaller than the minimum spark advance by at least 40°-50° of rotation of the crankshaft 5.

What disclosed above can be applied, with no significant changes, even when the drivetrain 6 of the road vehicle 1 is provided with a single-clutch, servo-assisted transmission.

The embodiments described herein can be combined with one another, without for this reason going beyond the scope of protection of the invention.

The control method described above has different advantages.

First of all, the control method disclosed above allows users to obtain, during a gear shift, a sound emitted by the exhaust system that has a highly "racing" character, without jeopardizing performances and without subjecting the internal combustion engine to excessive mechanical and thermal stresses.

Furthermore, the control method described above is easy and economic to be implemented as its execution requires a limited memory space and a reduced computing ability.

LIST OF THE REFERENCE NUMBERS OF THE FIGURES

1 road vehicle
2 front wheels
3 rear wheels
4 internal combustion engine
5 crankshaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 cylinders
19 intake duct
20 intake valves
21 exhaust duct
22 exhaust valves
23 throttle valve
24 piston
25 spark plug
26 fuel injector

The invention claimed is:

1. A control method to control a road vehicle (1) provided with an internal combustion engine (4) having a plurality of cylinders (18) and with a servo-assisted transmission (7); the control method comprises the steps of:
 establishing a minimum spark advance which should not be exceeded in order to avoid the risk of knocking or spontaneous ignitions of the mixture; and
 temporarily reducing, during a gear shift in the servo-assisted transmission (7), a torque generated by the internal combustion engine (4);
 wherein the step of temporarily reducing the torque during the gear shift comprises the further steps of:
 setting, for one single thermodynamic cycle of each cylinder (18), an actual spark advance, which is smaller than the minimum spark advance, so that the ignition takes place later than established by the minimum spark advance; and
 cancelling the injection of fuel into each cylinder (18) in the thermodynamic cycle immediately following the thermodynamic cycle carried out with an actual spark advance smaller than the minimum spark advance.

2. The control method according to claim 1 and comprising the further step of determining a quantity of fuel to be injected into each cylinder (18) during the single thermodynamic cycle carried out with an actual spark advance smaller than the minimum spark advance, so that the combustion takes place under exactly stoichiometric conditions.

3. The control method according to claim 2 and comprising the further step of determining a quantity of fuel to be injected into each cylinder (18) during all other thermodynamic cycles taking place during the gear shift and other than the thermodynamic cycle carried out with an actual spark advance smaller than the minimum spark advance, so that the combustion takes place under excess fuel conditions.

4. The control method according to claim 1 and comprising the further step of carrying out, with a spark advance greater than the minimum spark advance, so that the ignition takes place sooner than established by the minimum spark advance, all other thermodynamic cycles taking place during the gear shift and other than the thermodynamic cycle carried out with the spark advance smaller than the minimum spark advance.

5. The control method according to claim 1 and comprising the further step of taking to a maximum value an opening advance of exhaust valves (22) in each cylinder (18) during the single thermodynamic cycle carried out with an actual spark advance smaller than the minimum spark advance.

6. The control method according to claim 1 and comprising the further step of maximizing an opening of a throttle valve (23) during the intake in order to maximize the quantity of air taken in during the single thermodynamic cycle carried out with an actual spark advance smaller than the minimum spark advance.

7. The control method according to claim 1, wherein the single thermodynamic cycle with a spark advance smaller than the minimum spark advance in sequence in all cylinders (18), so that all cylinders (18) carry out said single thermodynamic cycle with a spark advance smaller than the minimum spark advance within a time window corresponding to two complete rotations of a crankshaft (5).

8. The control method according to claim 1, wherein the single thermodynamic cycle with a spark advance smaller than the minimum spark advance is carried out when a maximum reduction of the torque during the gear shift is requested.

9. The control method according to claim 1, wherein the actual spark advance smaller than the minimum spark advance is negative to correspond with an ignition delay and cause the ignition to take place past the top dead centre of the corresponding piston (24).

10. The control method according to claim 9, wherein the actual spark advance smaller than the minimum spark advance is such as to cause the ignition to take place before the opening of exhaust valves (22).

11. The control method according to claim 1, wherein the actual spark advance is smaller than the minimum spark advance by at least 40° of rotation of a crankshaft (5).

* * * * *